United States Patent [19]

Freed

[11] Patent Number: 4,867,614

[45] Date of Patent: * Sep. 19, 1989

[54] REINFORCED SOIL AND METHOD

[76] Inventor: W. Wayne Freed, 3915 Ivory Ave., Signal Mountain, Tenn. 37377

[ * ] Notice: The portion of the term of this patent subsequent to Dec. 13, 2005 has been disclaimed.

[21] Appl. No.: 227,903

[22] PCT Filed: Aug. 28, 1987

[86] PCT No.: PCT/US87/02109

§ 371 Date: May 20, 1988

§ 102(e) Date: May 20, 1988

Related U.S. Application Data

[63] Continuation-in-part of Ser. No. 914,871, Oct. 3, 1986, Pat. No. 4,790,691.

[51] Int. Cl.$^4$ .............................................. E02D 3/12
[52] U.S. Cl. ................................. 405/263; 106/400; 405/258
[58] Field of Search .................. 405/263, 264, 258; 106/99, 900; 523/132

[56] References Cited

U.S. PATENT DOCUMENTS

| | | | |
|---|---|---|---|
| 3,971,223 | 7/1976 | Barrett | 405/264 |
| 4,015,994 | 4/1977 | Hill | 106/99 |
| 4,199,366 | 4/1980 | Schaefer et al. | 106/99 X |
| 4,261,725 | 4/1981 | Schmidt | 405/264 X |
| 4,272,294 | 6/1981 | Jaunarajs | 106/99 |
| 4,403,891 | 9/1983 | Ohoka et al. | 405/267 X |
| 4,565,840 | 1/1986 | Kobayashi et al. | 106/99 X |
| 4,662,946 | 5/1987 | Mercer | 106/900 |

FOREIGN PATENT DOCUMENTS

| | | | |
|---|---|---|---|
| 0124582 | 9/1980 | Japan | 210/751 |
| 0040193 | 8/1982 | Japan | 106/900 |

OTHER PUBLICATIONS

R. Craig, J. Schuring, W. Costello and L. Soong, "Fiber Reinforced Soil-Cement", American Concrete Institute, Oct., Nov., 1986.

*Primary Examiner*—Dennis L. Taylor
*Attorney, Agent, or Firm*—Renner, Kenner, Greive, Bobak, Taylor & Weber

[57] ABSTRACT

Composite mixtures comprise soil and from about 0.1 to 5 percent by weight of additive discrete fiber materials. A related method for improving the engineering properties of soil includes the steps of adding from about 0.1 to 5 percent by weight of discrete fiber materials to soil and mixing the materials and soil together to form a blend.

24 Claims, No Drawings

REINFORCED SOIL AND METHOD

CROSS-REFERENCE TO RELATED APPLICATION

This application is a continuation-in-part of U.S. Ser. No. 914,871, filed Oct. 3, 1986, now patent No. 4,790,691, formerly titled FIBER REINFORCED SOIL AND METHOD.

TECHNICAL FIELD

The present invention relates to soils having improved engineering properties and a method by which the improvements can be imparted. In substantially every aspect of civil engineering and architecture, the relative strength of the soil as a support for foundations must be considered. Such areas as the construction of buildings, bridges, drains, roadways and the like require that the soil not yield under the load while land fills, soil embankments, slope treatment and the like require that the soil be protected from erosion. The present invention enhances the strength parameters of the soil, increases the resistance of the soil to punching shear and reduces the compressibility of the soil so that lesser amounts may be employed in many instances. Soils can now be strengthened without the addition of other components that have been used heretofore with varying degrees of success.

BACKGROUND ART

A variety of materials have been blended with soils to enhance or improve the properties thereof. In early highway construction, soil and rocks were mixed to provide a more stable, free draining, better performing roadbed. Lime has routinely been added to clay and silty soils to reduce their plasticities and to reduce their swelling potential. Portland cement has been added to several types of soils, being mixed in place or in a batch plant for achieving an improved highway base material. More recently, woven synthetic materials have been placed in horizontal layers of soil in order to achieve steep, stable earth slopes.

Examples of the last technique, involving the use of so-called geotextiles, have been described in the patent literature. U.S. Pat. No. 3,934,421, for instance, is directed toward a matting of continuous thermoplastic filaments that are bonded together at intersections. When placed in loose soil, the matting provides increased vertical load bearing capacity and resistance to lateral deformation.

U.S. Pat. No. 4,002,034 also discloses a matting, anchored to the ground, for preventing erosion. The matting is a multi-layered composite providing an uppermost layer having the finest fibers and least pore spaces and a ground side layer having the thickest fibers and greatest pore spaces.

U.S. Pat. No. 4,329,392 provides a layered matting designed to inhibit rearrangement of soil particles. The matting comprises melt-spun synthetic polymer filaments with macrofibers forming a web, a filter layer of finer fibers bonded thereto and an intermediate layer of other fibers therebetween. The mat has use below water level to control erosion.

U.S. Pat. No. 4,421,439 is directed toward woven fabric, comprising filaments such as polyester, polyamides and polyolefins. The fabric is positioned beneath sand, gravel, stones, clay, loam and the like at a depth of at least 10 cm. The invention is based on the particular construction of the fabric which gives it improved load bearing performance.

Another unique configuration of geotextile material is disclosed in U.S. Pat. No. 4,472,086. The material is used as a reinforcement for the construction of roadways and on slopes and river banks to control erosion.

Despite the wide-spread use of man-made or synthetic filaments in fabrics, matting and the like as a reinforcement for soil, the foregoing patents have not taught the use of individual fibers or other discrete synthetic textile materials blended with the soil. Discrete fibers have been employed heretofore in the reinforcement of concrete as set forth in U.S. Pat. No. 3,645,961. The patent discloses the use of nylon, polyvinyl chloride and simple polyolefins in lengths ranging between one-quarter to three inches (0.4 to 7.5 cm) to form a blast resistant concrete.

Actually, polypropylene fibers have been used to modify the behavior of concrete for over 20 years. Improvement in water tightness, reduction in cracks, toughness, ductility, and impact resistance have been noted. Steel fibers have also been used for this purpose with limited success. Nevertheless, few studies on fiber reinforced soil have been reported. Those that exist have generally centered around attempts to understand the effects of roots of vegetation on embankment slope stability, particularly of earth dams. Thus, improving the engineering properties of soil in this manner appears not to have been investigated heretofore.

DISCLOSURE OF THE INVENTION

It is therefore an object of the present invention to provide a composite soil mixture having improved load bearing capabilities and related engineering properties, thereby benefiting foundations and column supports.

It is a further object of the present invention to provide a method for improving the engineering properties of soils by the addition of various discrete fiber or slit film fiber materials thereto.

These and other objects, together with the advantages thereof over known soil mixtures and methods of treatment, which shall become apparent from the specification which follows, are accomplished by the invention as hereinafter described and claimed.

In general, the composite mixture of the present invention comprises soil and from about 0.1 to 5% by weight of discrete fiber materials selected from the group consisting of man-made fiber forming substances and fiberglass, mixed therein.

The method of the present invention includes the steps of adding from about 0.1 to 5% by weight of discrete fiber or slit film fiber materials selected from the group consisting of man-made fiber forming substances and fiberglass to soil and mixing the fiber and soil together to form a blend.

As used in the specification, the term "discrete" is intended to mean a fibrous material that is individually distinct or one which is not mathematically continuous. These materials are further intended to be substantially non-continuous or capable of being made non-continuous. As used in the specification, the term "man-made fiber forming substances" is intended to embrace both cellulosic and non-cellulosic or synthetic base materials.

It has been found that the present invention provides improvements of up to 50% in engineering properties particularly in the punching shear capabilities of certain types of soils by the addition of 0.5% discrete fiber materials by weight to the soils. Improvements of up to 250% have also been observed by the addition of 1.5% discrete fiber materials by weight to the soils. Resistance to punching shear is measured by the California Bearing Ratio or CBR test. Improved punching shear resistance provides for reduced pavement component thickness plus greater pavement longevity which, in turn, are important considerations in the construction of roadways and parking lots.

Among the other engineering properties noted hereinabove are the average total angle of internal friction, $\phi$, average total cohesion, C, and average initial tangent modulus, $E_T$, all of which significantly are improved by the invention. Steeper side slopes for embankments are possible inasmuch as the average angle of internal friction is improved significantly by the addition of the discrete fiber materials disclosed herein. As a result, less fill dirt is necessary and transportation costs can be reduced. Moreover, because space is often at a premium in highway and embankment construction, by using soil having improved properties, lateral spacing can be reduced.

Soil reinforced according to the present invention also provides the ability to reduce volume change or settlement in high fills because of the improved modulus. Likewise, the long term strength of backfill soils behind walls, retaining structures and the like are improved since greater cohesion and angle of internal friction values, or shear strength, produce lower earth pressures thereby reducing the potential for lateral movement. Also, less structural support is required for soils placed behind retaining structures. Finally, stabilizing the face of fill slopes, whether they be landfill slopes or dredge spoil (underwater) slopes, is accomplished by this invention based upon the extremely favorable enhancement of soil strength and deflection characteristics.

PREFERRED MODE FOR CARRYING OUT THE INVENTION

As noted hereinabove, practice of the present invention is based upon the addition of various discrete fiber materials into soil. As is known, the basic types of mineral soils are gravel, sand, silt and clay. Mixtures thereof give rise to coarse-grained soils, more than 50% retained on a No. 200 sieve, and fine-grained soil, 50% or more passes through a No. 200 sieve. No attempt shall be made to discuss the variations in soil types. Those skilled in the art are familiar with and can refer to the *Unified Soil Classification System* published as ASTM Standard D2487. With reference thereto, soils with which the invention can be practiced include gravel, sand, silt and clay.

The conventional fiber and slit film fiber materials that are added to the soil can be selected from the broad class of commercially available man-made fiber forming substances as well as fiberglass. Generally speaking, the materials should neither affect the soil nor be affected by the soil and therefore, the material should not mold, rot, mildew, dissolve or otherwise deteriorate in the soil environment but should maintain its basic integrity throughout its useful life.

One exception would occur where only temporary reinforcement is required. In coastal areas, for instance, the occurrence of a rash of severe storms can erode the natural dune structure. Use of a degradable fiber could provide temporary reinforcement of the soil structure until nature can again complete the task. Other instances can be envisioned where environmental considerations could be satisfied by employing biodegradable materials as opposed to the non-degrading types and thus, the present invention should not be limited to either type because in specific situations one type may be clearly preferred over the other.

Preferred materials include the olefins, particularly polypropylene, polyesters, nylons, acrylics and glass, but should not be limited to these. Degradable man-made fiber forming substances would include rayon, acetate, triacetate and biodegradable or degradable polyolefins. Practical considerations include creep resistance, a strong trait of polyesters, and dispersibility of the fiber material in the soil, although the absence of either one of these properties should not eliminate a particular polymer. Typically, man-made fibers having specific gravities ranging from about 0.80 to 2.36 and fiberglass with a specific gravity range of about 2.50 to 2.70 are suitable.

The reinforcing materials can be divided into two categories, fibers and slit film fibers. Slit film fibers are described in greater detail below; however, it is notable that for practice of the present invention they are fiber-like, that is, their length to width or crosssectional dimensions are comparable to fibers. Hence, the term discrete fiber materials has been employed herein to connote both fibers and slit film fibers. These two differ primarily by configuration although both are similarly dimensioned and are employed in approximately the same amounts. The soil can be reinforced with mixtures of both fibers and slit film fibers.

With respect first to the conventional fibers, configuration can be important, but is also not a controlling feature. Work reported hereinbelow provided very favorable results with monofilaments. Yet, other cross-sectional configurations such as rectangular, square, round, oval, hollow and the like may further enhance soil cohesion or other properties. Additionally, embossed, multi-lobal, collated or bonded fibers, triangular, entangled multifilaments filaments or monofilaments and fibrids and fibrils are other practical types for soil reinforcement provided they can be uniformly dispersed into the soil. The fiber configuration could also be slubbed, spiraled, gear crimped, saw-tooth configured, gnarled, cork-screwed or otherwise deformed to develop cohesion or other fiber/soil matrix properties.

Fiber length can range from about 0.5 to 4 inches (1.25 to 10 cm) with 0.75 to 1.5 inches (1.9 to 3.8 cm) being preferred. Fiber diameter is between about 0.003 to 0.10 inches (0.076 to 2.5 mm) and is variable depending upon the application. Fiber yield, i.e., denier, which is a length to weight ration, is between about 50 to 41,000. The amount of fiber added to the soil ranges from at least about 0.1 percent by weight up to about 5 percent by weight with 0.1 to 2 percent being preferred. Practically speaking, the upper limit is not dictated by operability but more a matter of diminishing returns. Thus, for many fibers, once more than about 2 percent have been added, higher performance values are offset by economics unless specific engineering properties, i.e., increased shear strength, are sought. Nevertheless, amounts in excess of 5 percent are not beyond the scope of this invention if such additions can be justified.

In the case of fibrids or fibrils, length and cross-section dimensions are variable and nonuniform. Fibrid and fibril lengths or bundle lengths of from about 0.0394 to about 0.472 inches (1 to 12 mm) are preferred, with individual fiber diameters being subject to the manufacturing process. Generally, fibrids and fibrils will range from micro-deniers to about 90 denier.

With respect to the slit film fiber materials, these are formed from films and sheets of the foregoing man-made fiber forming substances that have been slit into thin strips. These thin strips may be further split or treated by conventional processes into fibrillated or roll embossed film constructions. The films and sheets can be cut with conventional apparatus into narrow strips having both pairs of opposed sides parallel, e.g., rectangles and parallelograms, two sides parallel, e.g., trapezoids or no sides parallel, e.g., quadrangles and other polyganol strips.

Thickness of these strips may range from 0.001 to 0.020 inches (0.025 to 0.047) mm) and widths may vary as is necessary to achieve the final weight of the product desired. Lengths of the strips are comparable to that for the fiber materials disclosed hereinabove, namely from about 0.5 to about 4.0 inches (1.25 to 10 cm).

Similarly, the amount of such strips added to the soil ranges from at least about 0.1 percent by weight up to about 5 percent by weight, just as for the fibers, with 0.1 to 2 percent being preferred. The strips can also be deformed in various manners to develop greater cohesion and/or other properties with the soil.

In addition to the amounts of the fibers or slit film fiber materials or mixtures thereof that are to be added to the soil, another factor is depth of the composite soil/fiber and/or film fiber mixture. For roadway applications, the composite should be about 12 to 24 inches (30 to 60 cm) thick. For mass fills to supports for buildings, roads and all other used, the composite should be graded into all fill materials.

Addition of the discrete fiber materials to the soil is usually at the site and can be facilitated by broadcasting or laying the fibers or slit film fibers or both and blending via blade, graders, discs or harrows or by mixing with pulverizing mobile mixers, hydrostatic travel mixers, shredder mixers and the like. It is to be understood that neither the composite nor the method of the present invention is to be limited by any technique of mixing inasmuch as these steps are well known to those skilled in the art.

In order to demonstrate the effectiveness of the present invention to improve engineering properties of soil, several examples were prepared with varying amounts of fiber and tested and compared against the same soil without fibers as a control.

The soil used was taken from a site near Winnsboro, S.C. The sample was collected from the surface, below the organic topsoil and vegetation. This soil has been derived from the in-place weathering of metamorphic rock found in the Piedmont physiographic province. This province is characterized by rolling hills of moderate relief that are generally the "foothills" to the Blue Ridge Mountains. This province extends from Alabama through Maryland, including the states of Georgia, South Carolina, North Carolina and Virginia.

In order to classify the soils, tests were performed to determine the grain size, liquid limit, and plastic limit. Based upon these results, the soil was classified as a sandy silt, reddish brown in color. Average index properties include: liquid limit=52; plasticity index=15; specific gravity =2.79; and percent fines=88.5. According to the Unified Soil Classification System, the soil is classified as MH.

The fiber selected was a 30 mil (0.76 mm), crosssection polypropylene. The fibers were one inch (2.54 cm) long and exhibited an initial tangent modulus of 820 ksi (5658 MPa). The relatively large fiber diameter and short length were selected in anticipation of desirable application properties, such as resistance to wind disturbance, bulking, curling and the like. The particular fiber tested was a monofilament configuration which is typically characterized as having a round cross-section and is cylindrical in design.

The experimental work included soil classification tests as well as several quantitative tests to evaluate changes in engineering properties with increasing quantities of fiber added to the soil. The engineering properties of interest, including the testing method used to obtain these properties, are summarized in Table 1. The classification tests and testing methods are summarized on Table 2.

TABLE 1

| Test Methods Used to Determine Engineering Properties | | |
|---|---|---|
| Engineering Property | Symbol & Units | Test Procedures |
| Total Angle of Internal Friction | $\phi$, degrees | ASTM$^a$D-2850 EM 1110-2-1906$^b$ |
| Total Cohesion | C, thousands of pounds (kips) per square foot | ASTM$^a$D-2850, EM 1110-2-1906$^b$ |
| Initial Tangent Modulus | $E_T$, kips per square inch | ASTM$^a$D-2850, EM 1110-2-1906$^b$ |
| Resistance to Punching Shear | CBR, percent | ASTM$^a$D-1883 |

$^a$American Society for Testing & Materials, volume 04.08, "Soil & Rock; Building Stone" 1985
$^b$United States Army Corps of Engineers, EM 1110-2-1906 Laboratory Soils Testing, 1970

TABLE 2

| Test Methods Used to Determine Soil Classifications and Other Basic Properties | | |
|---|---|---|
| Classification Property | Symbol & Units | Test Procedure |
| Liquid Limit | LL, percent | ASTM D-4318 |
| Plastic Limit | PL, percent | ASTM D-4318 |
| Grain Size Distribution | None | ASTM D-422 |
| Specific Gravity | SG none | ASTM D-854 |
| Standard Proctor Maximum Dry Density | $\gamma$, pounds per cubic foot | ASTM D-698 |
| Standard Proctor Optimum Moisture Content | w, percent | ASTM D-698 |

The CBR test and its accompanying design curve is one of several methods used to evaluate subgrades for flexible pavement design. It is used in many areas of the world for designing highways, parking lots, and airfields, and is one of the most commonly used methods in the United States for pavement design.

Triaxial shear tests are used in geotechnical engineering practice to evaluate several relevant parameters. These include the angle of internal friction, the cohesion, the modulus of elasticity, peak shear strength, and other parameters. Triaxial shear tests can be performed with a variety of consolidation and drainage conditions. Each of these conditions provides different insights into likely performance of the soil under various loading conditions. For the work reported hereinbelow, unconsolidated, undrained tests were performed n simulated compacted fill to evaluate any change in soil strength as it relates to an "end-of-construction" condition for foundations and embankment slopes.

Each of the above tests was performed from three to five times in order to achieve a qualitative degree of statistical confidence in the results. No statistical evaluations were performed other than calculating an average value from the test results. The results of the standard Proctor compaction tests were used to identify densities and moisture contents to which both CBR and triaxial shear test specimens were prepared.

The liquid limit tests, plastic limit tests, specific gravity tests, and grain size distribution tests were only performed on the naturally occurring soil. All other tests were performed on a control group containing no fiber and soil that had ½%, 1% and 1½% fiber, by dry weight, blended into the test specimens.

Test Procedures

Fibers were mixed with soil in the following percentages by dry weight: ½, 1 and 1½%. The fibers were blended by hand until they appeared to be evenly distributed throughout the soil mass. Water was then added and blended into the soil by hand until thoroughly mixed. The moisture content of the soil/fiber blend was computed as the weight of water divided by the dry weight of the combined soil and fiber. Test specimens were allowed to "cure" at least 24 hours after water was blended before performing Proctor, CBR, and triaxial shear tests.

Three standard Proctor compaction tests were performed on the control group (no fiber), and 5 standard Proctor compaction tests were performed on each group with fiber blended into the soil (½%, 1% and 1½%). The maximum dry density and optimum moisture content were then determined graphically, and the average values then computed for each test group. These average values of maximum dry density and optimum moisture content were then used as the basis for preparing the CBR and triaxial shear test specimens.

Four sets of three CBR samples were prepared, including the control group and each percent fiber. The specimens were molded in the CBR mold to approximately the average maximum dry density and optimum moisture content determined from the groups density testing (Proctor tests). After completion of preparation, they were soaked by immersion in a water bath for four days, according to standard procedures, then tested. Test results are reported in Table 3.

TABLE 3

Summary of Proctor and California Bearing Ratio Test Data[a]

| Soil Description | Proctor Tests | | CBR at 0.1" | Ave. CBR at 0.1" | CBR at 0.2" | Ave. CBR at 0.2" |
|---|---|---|---|---|---|---|
| No Fiber | $\gamma$ = 93.1 pcf | W = 29.1% | 4.6 | | 4.9 | |
| No Fiber | $\gamma$ = 93.5 pcf | W = 28.9% | 5.1 | | 5.8 | |
| No Fiber | $\gamma$ = 92.1 pcf | W = 29.3% | 5.1 | | 5.4 | |
| No Fiber | | | | 4.9 | | 5.4 |
| ½% Fiber | $\gamma$ = 94.5 pcf | W = 26.2% | 10.8 | | 11.3 | |
| ½% Fiber | $\gamma$ = 96.2 pcf | W = 26.3% | 11.6 | | 12.1 | |
| ½% Fiber | $\gamma$ = 94.0 pcf | W = 26.3% | 11.6 | | 11.8 | |
| ½% Fiber | | | | 11.3 | | 11.7 |
| 1% Fiber | $\gamma$ = 96.9 pcf | W = 25.8% | 13.0 | | 13.3 | |
| 1% Fiber | $\gamma$ = 95.8 pcf | W = 25.7% | 11.6 | | 11.6 | |
| 1% Fiber | $\gamma$ = 93.6 pcf | W = 25.9% | 13.0 | | 13.3 | |
| 1% Fiber | | | | 12.5 | | 12.6 |
| 1½% Fiber | $\gamma$ = 93.8 pcf | W = 26.8% | 9.8 | | 10.9 | |
| 1½% Fiber | $\gamma$ = 94.7 pcf | W = 26.4% | 10.7 | | 11.2 | |
| 1½% Fiber | $\gamma$ = 93.8 pcf | W = 26.7% | 11.6 | | 12.9 | |
| 1½% Fiber | | | | 10.7 | | 11.7 |

[a]Specimens remolded to approximately 100% of their standard Proctor maximum dry density at approximately optimum moisture content.

The data in Table 3 indicates that with the addition of only ½% fiber, there is more than a doubling of the CBR value over the control. This could possibly lower the costs associated with constructing flexible pavements. As in example, for a typical motel parking lot built over a soil such as the one tested, for a CBR value of 5 without fiber and with 500,000 equivalent 18,000 pound axle loads applied to its ring roads over a 20 year period, a typical pavement profile would consist of 3 inches (7.6 cm) of Type I Asphaltic Concrete surface course with 10 inches (25.4 cm) of crushed stone base and 10 inches (25.4 cm) of soil stabilized sub-base. With the fiber enhanced soil, the profile could consist of 1.5 inches (3.8 cm) of Type I Asphaltic Concrete over a 10 inches (25.4 cm) crushed stone base and 10.5 inches (26.8 cm) of stabilized sub-base. As the traffic on a highway, airfield, or parking area increases, more dramatic reductions in stone and asphalt thicknesses could result. This example serves to indicate the general magnitude of savings in conventional paving material, in this case Asphaltic Concrete.

Four sets of three triaxial shear test specimens were prepared, including the control group and each percent fiber. The specimens were molded to approximately 100% of the Proctor test groups average maximum dry density at its average optimum moisture content. Confining pressures used were 1000, 3000, and 5000 psf (0.05, 0.14 and 0.25 MPa). The test results are tabulated in Table 4.

TABLE 4

Summary of Unconsolidated Undrained Triaxial Shear Test Data[a]

| Soil Description | Proctor Tests | | C, ksf | Ave. C ksf | $\phi$, Deg | Ave. $\phi$ Deg | Modulus[c] ksi | Ave. Modulus[c] ksi |
|---|---|---|---|---|---|---|---|---|
| No Fiber | | | | 1.80 | | 18.5 | | 596.4 |
| No Fiber | $\gamma$ = 93.3 pcf | W = 28.7% | 1.69 | | 19.5 | | 614.6 | |
| No Fiber | $\gamma$ = 93.3 pcf | W = 28.9% | 1.93 | | 17.0 | | 574.7 | |
| No Fiber | $\gamma$ = 94.3 pcf | W = 27.9% | 1.77 | | 19.0 | | 599.9 | |
| ½% Fiber | | | | 2.33 | | 21.3 | | 638.8 |
| ½% Fiber | $\gamma$ = 95.5 pcf | W = 26.7% | 2.40 | | 21.5 | | 658.5 | |

TABLE 4-continued

| Summary of Unconsolidated Undrained Triaxial Shear Test Data[a] | | | | | | | |
|---|---|---|---|---|---|---|---|
| Soil Description | Proctor Tests | | C, ksf | Ave. C ksf | φ, Deg | Ave. φ Deg | Modulus[c] ksi | Ave. Modulus[c] ksi |
| ½% Fiber | γ = 95.9 pcf | W = 26.5% | 2.20 | | 21.0 | | 632.3 | |
| ½% Fiber | γ = 95.9 pcf | W = 26.5% | 2.40 | | 21.5 | | 6.25 | |
| 1% Fiber | | | | 2.39 | | 19.8 | | 584.5 |
| 1% Fiber | γ = 95.2 pcf | W = 26.7% | 2.23 | | 18.5 | | 569.6 | |
| 1% Fiber | γ = 95.5 pcf | W = 26.5% | 2.54 | | 18.0 | | 570.0 | |
| 1% Fiber | γ = 95.6 pcf | W = 26.3% | 2.39 | | 23.0 | | 614.0 | |
| 1½% Fiber | | | | 2.70 | | 26.0 | | 701.8 |
| 1½% Fiber | γ = 96.2 pcf[b] | W = 25.4% | 2.78 | | 24.5 | | 679.7 | |
| 1½% Fiber | γ = 96.3 pcf | W = 25.3% | 2.57 | | 27.0 | | 723.8 | |
| 1½% Fiber | γ = 96.4 pcf | W = 25.1% | 2.74 | | 26.5 | | 701.8 | |

[a]Specimens molded to approximately 100% of their maximum dry density and approximately optimum moisture content
[b]Average of 3 Test Specimens
[c]Initial Tangent Modulus at 3 ksf Confining Pressure The data reported in Table 4 show extremely favorable enhancement of the soil strength and deflection characteristics. By graphing the data, a linear relationship between triaxial strength characteristics and increasing fiber content is suggested.

As an example of how the presence of fibers in soil enhance one practical application related to the triaxial shear test, a square footing 5×5 feet (152 cm×152 cm) resting on the ground surface can be considered. First, where the soil has not been enhanced by the addition of fibers, the footing could theoretically support approximately 333,000 pounds (151,182 Kg). This same soil with ½% fiber could theoretically support about 500,000 pounds (227,000 Kg) (an increase of 55%) and with 1½% fibers, the footing could theoretically support about 833,000 pounds (378,182 Kg); two and one half times as much as the nonreinforced soil.

Based upon the foregoing disclosure, it should now be apparent that the present invention carries out the objects set forth hereinbove. It should be apparent to those skilled in the art that the addition of fibers and/or slit film fiber materials to a variety of soils is possible just as a wide variety of fibers and slit film fiber materials are available from which to choose. Although the invention has been exemplified by the addition of a round polypropylene fiber to soil from South Carolina, it is to be understood that such examples were provided to enable those skilled in the art to have representative examples by which to evaluate the invention and thus, these examples should not be construed as any limitation on the scope of the invention. Similarly, the length of reinforcing material, its configuration and the amount added to a given soil can all be determined from the disclosure provided herein.

From the test results reported, it should be apparent that the possible benefits of fiber reinforced soil are great as is also true for the use of slit film fiber materials alone or in conjunction with conventional fibers. In addition to providing support for columns and foundations, reinforced soil as described herein can be employed to provide steeper side slopes for embankments and the ability to maintain stable fill slopes, including dredge spoil slopes. Other potential applications include reduction in the vertical and lateral movement of compatible fill; use for erosion control in slopes; enhancement of long term strength of backfill soils behind walls and, earth liners.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

I claim:

1. Reinforced soil having improved engineering properties for construction and excavation purposes comprising:
   natural soil selected from the group consisting of gravel, sand, silt, clay and mixtures thereof; and
   from about 0.1 to 5 percent by weight of discrete fiber materials mixed therein to improve the punching shear resistance, the total angle of internal friction, the average total cohesion and the average initial tangent modulus of said soil, said fiber materials being selected from the class consisting of man-made fiber forming substances and fiberglass.

2. Reinforced soil, as set forth in claim 1, wherein said soil is a low plasticity silt.

3. Reinforced soil, as set forth in claim 1, wherein said discrete fiber materials are polyolefinic.

4. Reinforced soil, as set forth in claim 3, wherein said discrete fiber materials are polyolefinic.

5. Reinforced soil, as set forth in claim 3, wherein said discrete fiber materials are selected from the group consisting of degradable or biodegradable polyolefins.

6. Reinforced soil, as set forth in claim 5, wherein said soil is sand and said biodegradable polyolefin is utilized for beach stabilization.

7. Reinforced soil, as set forth in claim 1, wherein said discrete fiber materials are polyester.

8. Reinforced soil, as set forth in claim 1, wherein said discrete fiber materials are from about 1.25 to 10 cm long and have a thickness of about 0.12 to 2.5 mm.

9. Reinforced soil, as set forth in claim 1, wherein said discrete fiber materials are from about one to 12 mm long and have a thickness of about 0.12 to 2.5 mm.

10. Reinforced soil, as set forth in claim 1, wherein the specific gravity of said man-made fiber forming substances ranges from about 0.80 to 2.36.

11. Reinforced soil, as set forth in claim 1, wherein specific gravity of said fiberglass ranges from about 2.5 to 2.7.

12. Reinforced soil, as set forth in claim 1, wherein said discrete fiber materials comprise conventional fibers and slit film fibers having a discrete length.

13. A method for improving the engineering properties of natural soils for construction and excavation purposes comprising the steps of:
   adding from about 0.1 to 5 percent by weight of discrete fiber materials to natural soil to improve the punching shear resistance, the total angle of internal friction, the average total cohesion and the average initial tangent modulus of said soil, wherein said fiber materials are selected from the class consisting of man-made fiber forming substances and fiberglass and said natural soil is selected form the group consisting of gravel, sand, slit, clay and mixtures thereof; and mixing said materials and natural soil together to form a blend.

14. A method, as set forth in claim 13, using a low plasticity silt.

15. A method, as set forth in claim 13, using polyolefinic discrete fiber materials.

16. A method, as set forth in claim 15, using polypropylene discrete fiber materials.

17. A method, as set forth in claim 13, using discrete fiber materials selected from the group consisting of degradable or biodegradable polyolefins.

18. A method, as set forth in claim 17, using sand and said biodegradable polyolefin for beach stabilization.

19. A method, as set forth in claim 13, using polyester discrete fiber materials.

20. A method, as set forth in claim 13, using discrete fiber materials having a length of about 1.25 to 10 cm and a thickness of about 0.12 to 2.5 mm.

21. A method, as set forth in claim 13, using discrete fiber materials having a length of about one to 12 mm and a thickness of about 0.12 to 2.5 mm.

22. A method, as set forth in claim 13, employing man-made fiber forming substances having a specific gravity ranging from about 0.80 to 2.36.

23. A method, as set forth in claim 13, employing fiberglass having a specific gravity ranging from about 2.5 to 2.7.

24. A method, as set forth in claim 13, using discrete fiber materials comprising fibers and slit film fibers.

* * * * *

UNITED STATES PATENT AND TRADEMARK OFFICE
CERTIFICATE OF CORRECTION

PATENT NO. : 4,867,614

DATED : September 19, 1989

INVENTOR(S) : W. Wayne Freed

It is certified that error appears in the above-identified patent and that said Letters Patent is hereby corrected as shown below:

Column 4, line 40, "multifilaments _filaments_ or" should read -- multifilaments or --.

Column 5, line 15, "(0.025 to 0.047)mm)" should read -- (0.025 to 0.047mm) --.

Column 5, line 32, "used" should read -- uses --.

Column 5, line 33, "materials" should read -- material --.

Column 6, line 32, "EM1110-2-1906 Laboratory Soils Testing" should be underlined.

Column 6, line 65, "performed n" should read -- performed on --.

Column 10, in Table 4, under the heading "Modulus ksi", the second value "6.25" should read -- 625.6 --.

Column 10, line 38, "polyolefinic" should read -- polypropylene --.

Claim 13, column 11, line 22, "form" should read -- from --.

Signed and Sealed this

Eighth Day of December, 1992

*Attest:*

DOUGLAS B. COMER

*Attesting Officer*   *Acting Commissioner of Patents and Trademarks*